July 3, 1951    C. C. SPERLING    2,559,564
PNEUMATIC AND AIR SWEEP CLOSURE
Filed Sept. 10, 1945
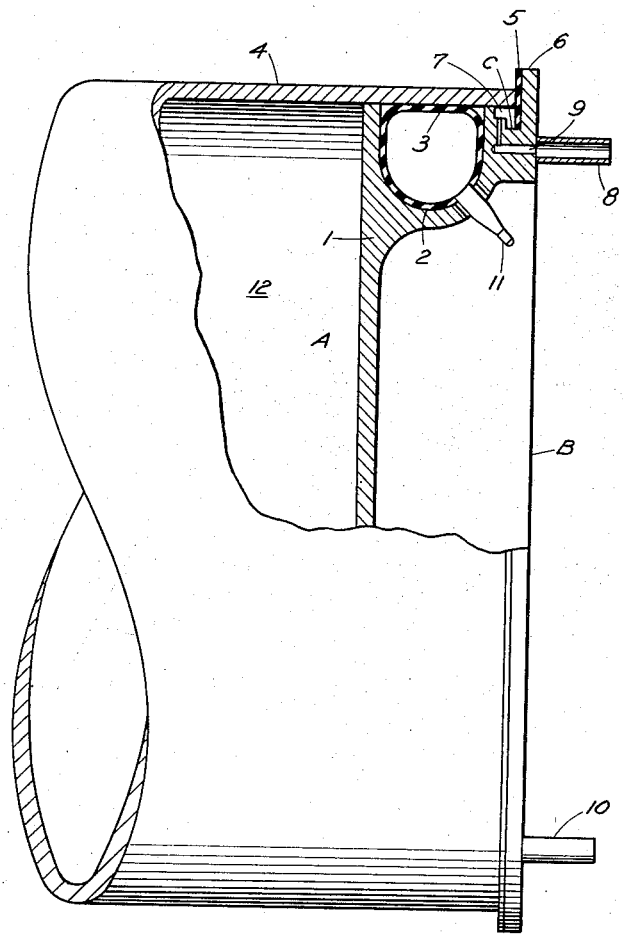
INVENTOR.
Curren C. Sperling
BY
Robert A. Townsend Patented July 3, 1951

2,559,564

UNITED STATES PATENT OFFICE 2,559,564

PNEUMATIC AND AIR SWEEP CLOSURE

Curren C. Sperling, Oak Ridge, Tenn., assignor to the United States of America as represented by the United States Atomic Energy Commission Application September 10, 1945, Serial No. 615,468

3 Claims. (Cl. 220—46)

This invention relates to pneumatic closures. More particularly this invention relates to a pneumatic and air sweep closure for use in sealing the ends of a test specimen which is undergoing a test for leakage.

Various methods have been developed for testing numerous devices to ascertain whether or not the device is free from flaws which may cause leakage. For example, such devices as pipes, containers and the like may be subjected to a test which involves maintaining a vacuum in the specimen undergoing test and measuring any changes in the atmosphere within the specimen caused by the leakage of the surrounding atmosphere through the walls thereof.

A particularly useful testing method is that which utilizes a mass spectrometer to detect the presence in the vacuum system of minute quantities of a selected gas such as helium, propane, and the like for which the ion accelerating field of the mass spectrometer has been set to produce a distinct response. In the operation of this method, the test specimen is connected by a control valve to a mass spectrometer and the entire system continuously evacuated. The selected gas, called the probe gas, the presence of which in the mass spectrometer will produce a distinct response, is directed against the exterior of the test specimen. Several methods may be employed in directing the probe gas against the test specimen. One method involves enclosing the specimen within a suitable hood and introducing the probe gas through a suitable opening thereby surrounding the test specimen with an atmosphere of the probe gas. A second method involves directing the probe gas over the surface of the test specimen in a relatively fine low pressure stream by means of a suitable device such as a nozzled tube. If a leak is present in the specimen, the probe gas will flow into the vacuum system and into the ionization region of the mass spectrometer, and will cause the mass spectrometer to give an indication of the presence of the probe gas within the confines of the test specimen. Thus only the presence of the probe gas in the vacuum system and mass spectrometer will produce the distinctive signal thereby enabling the detection of leaks in the test specimen.

In conducting a test of the type described above, the success and accuracy thereof depends largely upon the complete sealing of any openings in the test specimen so that any in-leakage in probe gas results only from passage through a flaw in the specimen under test. Therefore, in the operation of such a method upon a specimen such as a pipe, it is necessary to completely seal the end of the pipe in order to utilize such a method of leak detection.

Various types of end seals were tried in conjunction with the operation of a system such as that described above and were found unsatisfactory for this purpose since they were not reliable as to sealing ability, and therefore required too much operational time to be spent in checking and sealing the closure itself before the work of testing the specimen could be started. On mass production testing this delay proved to be of major importance.

It is an object of this invention to provide a method of and means for effectively sealing the ends of test specimens undergoing leak detection.

It is a further object of this invention to provide means for the sealing of such test specimens which are of such construction as to only require a minimum time for installation.

It is a further object of this invention to provide a sealing means which eliminates the necessity of testing after installation.

Still another object of this invention is to provide a sealing means which may be subjected to handling during the testing procedure without danger of causing leaks through any openings of the test specimen.

Still another object of this invention is to provide a combined pneumatic and air sweep closure which may be easily constructed and which eliminates the possibility of any in-leakage of probe gas into the specimen being tested.

These and other objects of this invention will become apparent to the skilled worker in the art upon becoming familiar with the following description when taken in connection with the accompanying drawing in which the figure is an elevational view partly in section of my pneumatic and air sweep closure in sealing relationship to a test specimen.

In the drawing, the pneumatic and air sweep closure comprises a circular member 1, one end having a diameter A substantially equal to but less than the diameter of the test specimen 4. Circular member 1 has a U-shaped groove 2 extending around its periphery into which is fitted an inflatable sealing member 3, such as a rubber tube. Inflatable sealing member 3, when inflated, produces a pneumatic seal against the inner wall of the test specimen 4. The other end of the circular member 1 has a diameter B greater than the diameter A such that it forms a collar 6 against which the test specimen may come to rest. If desired, a gasket 5, of suitable material such as rubber, cork, paper and the like, may be placed between the edge of test specimen 4 and the collar 6. If employed, the gasket 5 serves to protect the edges of the test specimen 4 as well as the inner face of the collar 6. Between the collar 6 and the U-shaped groove 2 is situated a section whose diameter C is less than the diameter A which creates a chamber 7 between the circular member and the inner wall of test specimen 4. This chamber 7 constitutes the air sweep portion of the closure. A short section of pipe 8 is attached to the collar 6 by a suitable means such as a weld at the point where the inlet channel 9 to the chamber 7 emerges from the circular member 1. Pipe 8 serves as the inlet for the sweeping fluid, which is preferably dry compressed air, but may be any other fluid, preferably a gas, suitable for use under the conditions obtaining, such as nitrogen, carbon dioxide, and the like. A second section of pipe 10 is attached by suitable means such as welding to the collar 6 at the point where the outlet channel from the inner chamber 7, which outlet channel is identical to the inlet channel 9, emerges from the circular member 1, at a point diametrically opposite to the inlet channel 9 and the inlet pipe 8. This pipe 10 serves as the outlet for the dry compressed air or other sweeping fluid mentioned above.

In the operation of my invention, circular member 1 is slipped into the test specimen 4 until the edges of test specimen 4 contact the gasket 5. The inflatable sealing member 3 is then inflated by means of the valve 11. The pressure of the inflatable sealing member 3 against the inner wall of testing specimen 4 effectively holds the unit in position, and also seals the evacuated section 12 of test specimen 4 from the atmosphere surrounding the outside of the test specimen 4. The sweeping fluid, such as dry compressed air, at a pressure slightly above atmospheric pressure, say approximately 16 pounds per square inch absolute, in forced through inlet pipe 8, and by way of the inlet channel 9, seals the inner chamber 7 with a sweeping fluid at a pressure slightly greater than atmospheric. The sweeping fluid which is not lost by leakage, leaves the chamber 7 by way of the outlet channel (not shown) which provides a passage between chamber 7 and the outlet pipe 10 which may be controlled by suitable means (not shown) such as a valve to maintain the desired pressure within chamber 7.

Under these conditions, chamber 7 then constitutes a positive pressure seal against the vacuum section 12 and the atmosphere through the contact seal between the test specimen 4 and the gasket 5. Any leakage which occurs must be the dry compressed air leaking outwardly towards the atmosphere or inwardly towards the evacuated section 12. The inward leakage is very small due to the pneumatic seal provided by the pressure of the inflated sealing member 3 against the inner walls of the test specimen 4. The outleakage occurring at the junction of the test specimen 4 and the gasket 5 precludes the possibility of any of the probe gas from leaking into the evacuated section 12 in that the pressure of the sweeping fluid in chamber 7 is greater than that of the probe gas.

The inleakage which may occur, and which must only consist of the sweeping fluid, is of such a magnitude that the sensitivity of the testing device could not be affected, therefore no distinctive signal could be produced by the testing device due to the aforementioned inleakage since such a signal can only result from inleakage of the probe gas.

The arrangement described above, eliminates the necessity of testing the end closure after installation, thereby saving a considerable amount of production time which was formerly lost in testing previous types of closures after their installation on the test specimen.

An added feature lies in the fact that, because of its construction, the closure may be subjected to considerable handling during the testing period. Such handling does not result in failure of the seal.

Although the above description has been made with reference to a test specimen of circular cross section, it is not intended that my invention be limited to such a geometrical configuration in that it may be adapted for use in the testing of specimens having other cross sections, such for example as a specimen having an elliptical cross section, a hexagonal cross section, and the like.

My invention may also be utilized in conjunction with the testing of specimens by a method involving the maintenance of pressure rather than a vacuum within the confines of the specimen. For example, a test may be conducted in such a manner that a suitable indicating gas such as an inflammable gas is maintained under pressure within the specimen. Leakage through the walls of the specimen may be detected by probing the outer surface thereof with a torch which would indicate any point to which the inflammable gas may be leaking.

In the use of my invention in such a test system, it is desirable to maintain the pressure of the sweeping fluid in chamber 7 at a pressure greater than the pressure of the gas within the test specimen. By doing so, leakage of the indicating gas through the end of the pipe or other specimen undergoing test is avoided. In such a system, the sweeping fluid obviously should be an inert gas which will not respond to the testing devices in a manner similar to that of the indicating gas.

While my invention has been described with reference to particular methods and reference to a particular apparatus, it is not intended to be limited thereby. Therefore, changes, omissions, and/or additions may be made without departing from the spirit of my invention as defined in the appended claims which are intended to be limited only as required by the prior art.

I claim:

1. In combination, a tubular member and closure therefor, said closure comprising a circular member having a diameter slightly less than the diameter of said tubular member and having a groove extending around the periphery of the innermost end thereof, said groove carrying an inflatable sealing member therein adapted to provide a seal against the wall of said tubular member, said circular member also having at the outermost end thereof an extended portion adapted to form a collar against the edge of said tubular member, a second groove positioned between the first mentioned groove and the extended portion and adapted to form an annular chamber between said circular member and the inner wall of said tubular member, and means for introducing air into said annular chamber at a pressure greater than the pressure of the atmosphere surrounding said tubular member.

2. In combination with a test specimen, a pneumatic closure comprising a member adapted to fit into the end of said test specimen, said member carrying an inflatable member around the periphery of the innermost end thereof and having at the outermost end thereof an extended portion adapted to form a collar against the edge of said test specimen, an annular groove located adjacent to said extended portion and adapted to form an annular chamber between said member and the inner wall of said test specimen, and means for introducing compressed air into said annular chamber at a pressure greater than the pressure of the surrounding atmosphere.

3. In combination with a pipe section to be tested, a pneumatic closure comprising a circular member having a diameter substantially equal to but less than the diameter of said section and having a groove extending around the periphery of the innermost end thereof, said groove carrying an inflatable sealing member therein adapted to provide a seal against the inner wall of said pipe section, said circular member also having at the outermost end thereof an extended portion adapted to rest against the edge of said pipe section, a sealing gasket adjacent to said extended portion, a second groove positioned between the first-mentioned groove and said gasket and adapted to form an annular chamber between said circular member and the inner wall of said pipe section, and means for introducing compressed air into said annular chamber at a pressure greater than the pressure of the atmosphere surrounding said pipe section.

CURREN C. SPERLING.

REFERENCES CITED

The following references are of record in the file of this patent:

UNITED STATES PATENTS

| Number | Name | Date |
|---|---|---|
| 958,421 | McIlvrid | May 17, 1910 |
| 1,221,733 | Henderson | Apr. 3, 1917 |
| 1,636,243 | Rasmussen | July 19, 1927 |
| 1,710,439 | Taylor | Apr. 23, 1929 |
| 1,826,941 | La Mont | Oct. 13, 1931 |
| 2,342,616 | O'Brien | Feb. 22, 1944 |
| 2,355,658 | Lawler | Aug. 15, 1944 |

FOREIGN PATENTS

| Number | Country | Date |
|---|---|---|
| 17,795 | Great Britain | 1896 |
| 413,364 | Great Britain | July 19, 1934 |